Dec. 3, 1940.  R. W. JOHNSON  2,224,053
REFRIGERATOR CONTROL
Filed Feb. 11, 1938  2 Sheets-Sheet 1
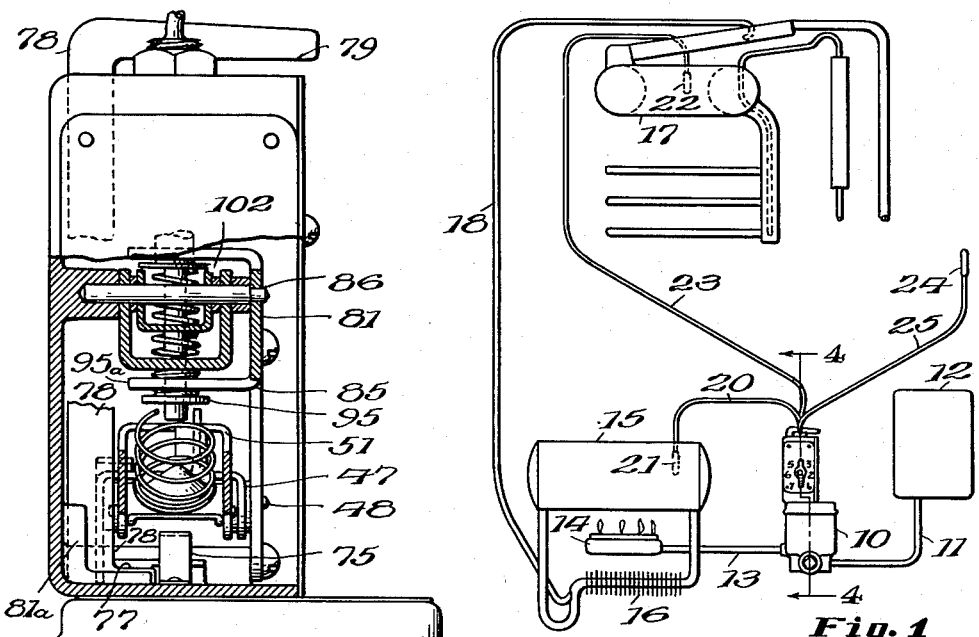
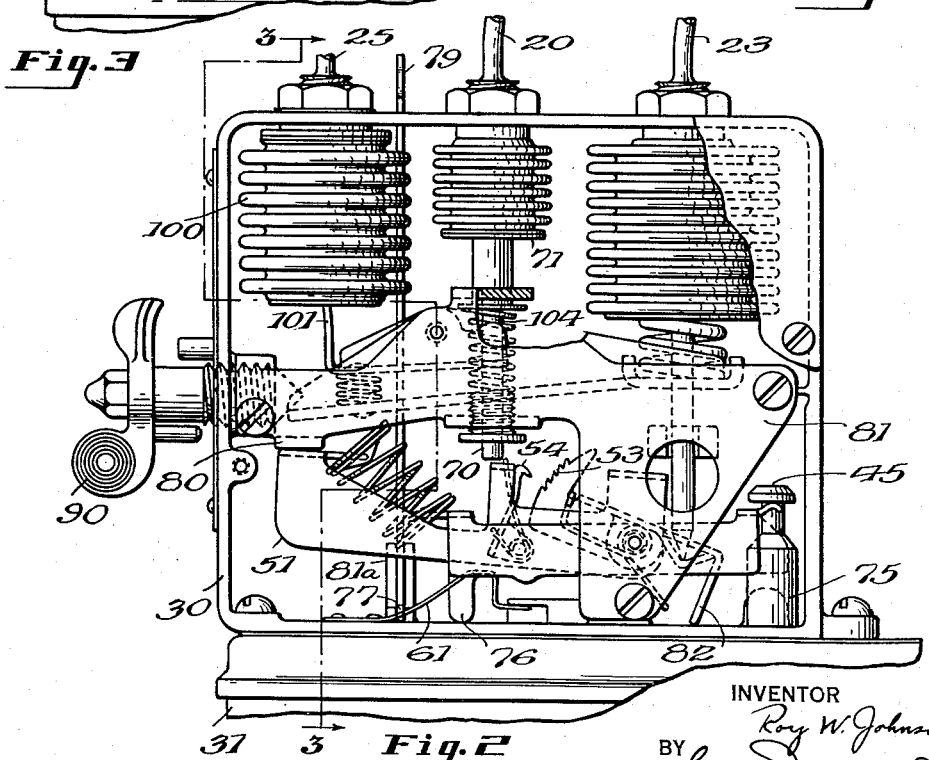
INVENTOR
Roy W. Johnson,
BY George Douglas Jones
ATTORNEY Dec. 3, 1940.                R. W. JOHNSON                2,224,053
                           REFRIGERATOR CONTROL
                       Filed Feb. 11, 1938         2 Sheets-Sheet 2

INVENTOR
Roy W. Johnson,
BY George Douglas Jones
ATTORNEY

Patented Dec. 3, 1940

2,224,053

UNITED STATES PATENT OFFICE 2,224,053

REFRIGERATOR CONTROL

Roy W. Johnson, Milwaukee, Wis., assignor to Allyne Laboratories, Inc., Cleveland, Ohio, a corporation of Ohio Application February 11, 1938, Serial No. 190,087

10 Claims. (Cl. 62—5)

This invention relates to a method and certain devices used for controlling the operating cycle of an intermittent absorption refrigeration machine.

In a machine of this type, the temperature in the refrigeration compartment is controlled by the amount of refrigerant condensed during a generating period. The quantity condensed is determined by the shut-off temperature in the still-absorber or generator.

In a room where the temperature is 60 degrees Fahrenheit and but little refrigeration is required, a generator shut-off temperature of 275 degrees Fahrenheit is satisfactory. Whereas, in a room at 100 degrees, which calls for maximum refrigeration, the shut-off temperature in the generator will be 370 degrees.

There is a practically straight line relationship between these minimum and maximum points. In other words, the indicated shut-off temperature will vary in direct proportion with the room temperature.

Hitherto there has been no satisfactory manner, other than manual operation, for obtaining the required regulation of generator shut-off temperature in response to inevitable variations in room temperature in the vicinity of the machine.

Since the intermittent absorption type refrigerators in use previous to my invention are generally operated by the use of kerosene or similar fuel, it has been the practice to close the fuel supply valve at one predetermined generator temperature and to open said valve when the charge of the refrigerant in the evaporator of the machine had become exhausted, permitting a rise in temperature in the compartment. Automatic functioning apparatus could be provided for performing the method last outlined but only at the expense of poor fuel economy and sub-freezing refrigerating compartment temperatures.

If the ambient temperature fell below the optimum for the apparatus setting, there would be a highly undesirable waste of refrigeration. On the other hand, if the ambient temperature rose above this optimum, there would be danger of insufficient refrigeration. Only by varying the shut-off temperature of the generator with the ambient temperature can efficient intermittent operation be obtained.

An object of the invention is to provide a mechanism actuated by thermostats for opening and closing a fuel valve supplying fuel to the burner of the still of a refrigeration system, the opening of the valve being controlled by the temperature in the evaporator and the closing of the valve by the temperature in the still.

Another object of the invention is to provide convenient means for adjusting the maximum temperature in the evaporator of a refrigeration system and automatically adjusting for fast or slow operation of the system, depending on the rise or fall in temperature outside of the system.

Another object is to provide snap action of the fuel valve so that it will be maintained in either a fully open or fully closed position.

A further object is to provide a mechanism such that a small increase in temperature in the evaporator will open the fuel valve, irrespective of the setting or adjustment of the evaporator thermostat.

The control device or mechanism of the present invention includes three thermostatic elements. One of these elements is positioned in close proximity to the evaporator of such a machine, a second thermostatic element is located in the still-absorber, and the third element is placed without the machine so as to respond to changes in room temperature. Each element comprises a bulb filled with a liquid having a suitable coefficient of expansion, and is connected to an otherwise sealed bellows.

The bellows which is connected to the thermostatic bulb associated with the evaporator or refrigeration compartment is operable to open a valve which supplies kerosene or other fuel to a main burner which heats the still-absorber. A pilot burner (not shown herein) is operated continuously from a separate fuel supply.

Closing of the fuel supply valve is accomplished by expansion of the bellows which is associated with the second thermostatic element, located within the still-absorber.

An intermittent operation of the machine is obtained by use of the two bellows which respectively cause the fuel supply valve to be opened or closed. An appropriate rise in temperature in the refrigeration chamber will cause the fuel valve to open. The main burner will then operate steadily until it has produced an increase in temperature within the still-absorber, at which time the other bellows will operate to close the fuel valve. Before the fuel valve is closed, an amount of ammonia or other refrigerant vapor sufficient to provide a desired refrigerating effect for a selected period will have been transferred from the still-absorber to the evaporator.

A novel method of controlling and varying the refrigerating cycle of such a machine is entailed in the function of the third thermostatic bulb which is responsive to changes in ambient temperature. Through suitable mechanism, which will be specifically described, this third bulb and an associated bellows operate to modify the action of the still-absorber thermostatic bulb in closing the fuel valve. As the room temperature rises, the closing of the fuel valve will be deferred progressively to keep the still-absorber operating for longer periods. Conversely, a lower room temperature will have the effect of hastening the closing of the main fuel valve.

The present method has for its essence the regulation of the temperature in a still-absorber automatically and simultaneously in response to variations in room temperature.

Suitable manual adjustments are provided for setting the fuel valve opening bellows to give a desired maximum evaporator temperature and for regulating the valve closing bellows to respond to a selected temperature in the still-absorber.

There is incorporated in the automatic control mechanism of this invention a ratchet which is associated with the bellows for opening the fuel valve under all conditions. When the fuel valve is first opened by a manually operated latch member which is provided, it is very likely that the valve-opening bellows will be in an extremely distended position due to an abnormally high evaporator temperature, corresponding closely to room temperature. Under these circumstances, it is improbable that the lowest evaporator temperature on the first cycle will reach the normal turn-on point of, say, 31 degrees. It is the function of the ratchet to accommodate the control mechanism in its special position and to insure cycling until normal operating conditions are reached.

With the above and other objects in view, the invention may be said to comprise a novel method of refrigeration control and a mechanism as illustrated in the accompanying drawings hereinafter described and particularly set forth in the appended claims together with such variations and modifications thereof as will be apparent to one skilled in the art to which the invention appertains.

Reference should be had to the accompanying drawings in which:

Fig. 1 is a diagrammatic view showing parts of a refrigeration system based on the absorption principle with the present invention connected thereto;

Fig. 2 is an elevational view of the upper portion of the control device with parts broken away;

Fig. 3 is a sectional view taken on the line 3—3 of Fig. 2; and

Figure 4:
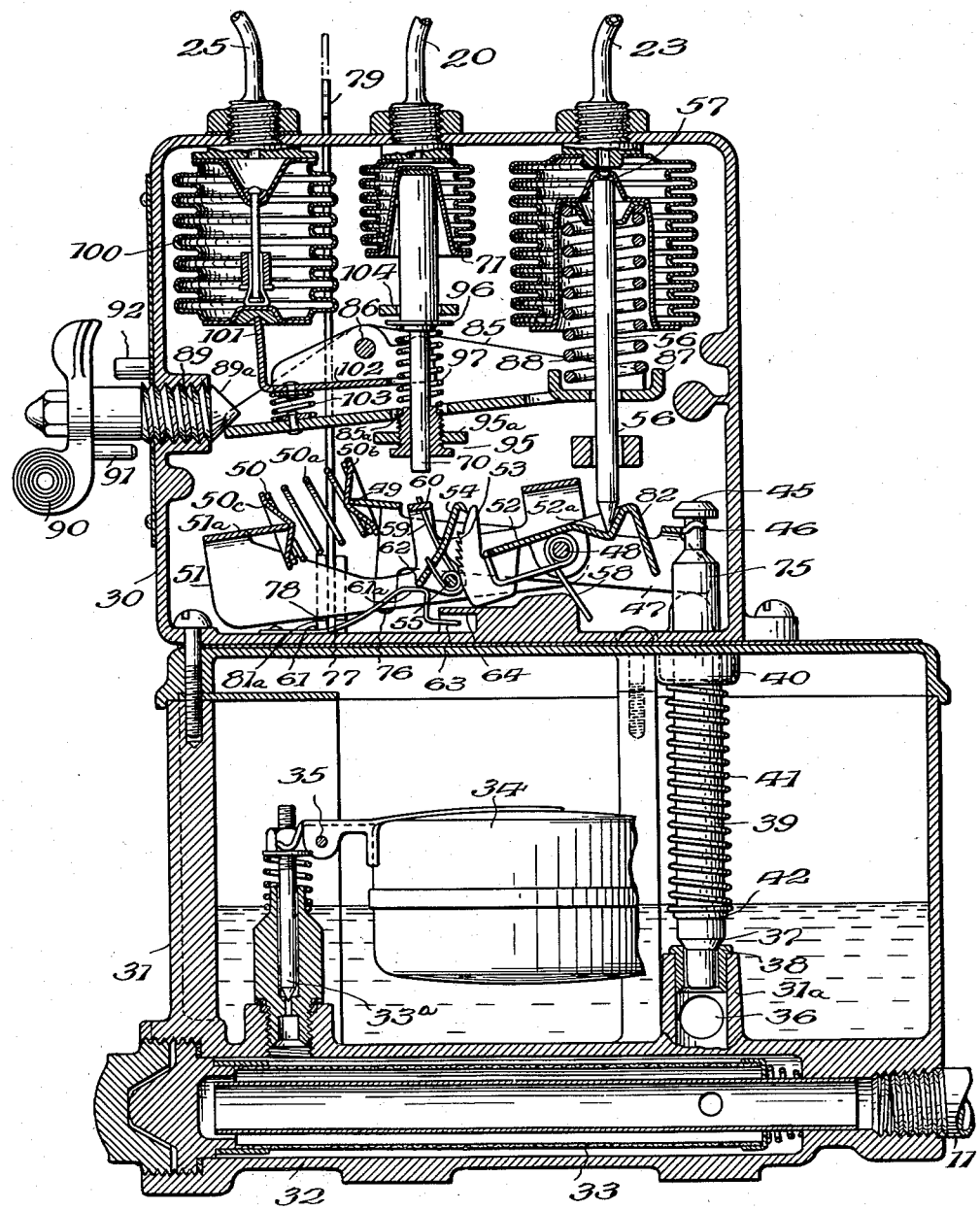
Fig. 4 is a sectional view taken on line 4—4 of Fig. 1.

Referring in detail to the drawings, in which like reference numerals refer to like parts throughout the several views, the control device is designated generally by the numeral 10. It is connected by a fuel supply pipe 11 to a fuel tank 12 and by pipe 13 to a burner 14. While the present invention is shown as applied to a refrigerator using liquid fuel, it should be understood that it may be applied to a system using gaseous fuel, in which case the control device would be connected to a gas main or other source of supply. Burner 14 supplies heat to a still-absorber 15 which is connected to a cooling coil 16 and to an evaporator 17 by piping 18.

The control device 10 is connected by tubing 20 to a thermostat bulb 21 positioned in a suitable well in the shell of the still-absorber 15. A second thermostat bulb 22 is positioned in the evaporator 17 and connected to control device 10 by tubing 23. A third thermostat bulb 24 may be placed in any convenient place where it will be exposed to "room temperature." Bulb 24 is connected to control device 10 by tubing 25.

As shown in Figs. 2, 3, and 4 the control device 10 comprises a system of thermostatically operated levers enclosed in a casing 30, and fuel regulating valves contained in a fuel chamber 31. Formed on the lower part of chamber 31 is a cylindrical portion containing a second chamber 32. Within the second chamber 32 a screen 33 of tubular form is disposed so as to strain fuel entering from the pipe 11. The recess 32 is arranged to discharge fuel through a needle valve 33a into the interior of chamber 31. A float 34 fulcrumed on pin 35 controls the needle valve 33a to maintain a constant level of fuel in the chamber 31.

Flow of fuel to the burner 14 is controlled by a valve 37, comprising a seat 38 and a plunger 39. The seat 38 is secured in the upper end of a short tubular extension 31a formed on the bottom of chamber 31, the tubular extension communicating with the pipe 13 leading to the burner 14. The seat 38 is disposed below the liquid level maintained by the float 34 so that when the plunger 39 is raised from the seat 38 fuel may flow downward and into pipe 13, through an opening 36 near the bottom of the extension 31a.

Plunger 39 extends upwardly into the casing 30 through a cup 40 containing a liquid seal at the top of the fuel chamber 31, and is urged downwardly against seat 38 by a compression spring 41 interposed between the bottom of cup 40 and a collar 42 on said plunger.

Within the casing 30 the upper end of the plunger 39 has formed on its upper end a button-like head 45, the under side of which may be engaged by a finger 46 on a lever 47. Lever 47 is fulcrumed on a pin 48 secured to the casing 30, and has a projection 49 formed on the end which is remote from finger 46. An extensible toggle link 50 such as is commonly used in snap action mechanisms, comprising a compression spring 50a disposed between opposed conical end plates 50b and 50c, is interposed between projection 49 on lever 47 and a projection 51a on a second lever 51. Lever 51 is also fulcrumed on pin 48. Both levers 47 and 51 are of substantially channel shaped cross section with web portions cut away to permit movement of associated parts, lever 51 being made narrower than lever 47 so that its leg portions are inside the leg portions of lever 47, as shown in Fig. 3. Also pivoted on pin 48 is a third lever 52 having formed on one end a toothed segment 53. Segment 53 may be engaged by a pawl 54 pivoted on a pin 55 carried by leg portions of the lever 51. Lever 52, at its end which is remote from segment 53, has formed thereon a conical depression 52a to receive the lower end of a vertical push rod 56 which is connected to the free end of a bellows 57 associated with the thermostat bulb 22. A torsion spring 58 is wound about the pin 48 and connected to the lever 52 so as to urge the segment 53 in a downward direction.

The pawl 54 is urged out of engagement with segment 53 by a torsion spring 59 wound about the pin 55. A portion of lever 51 forms a bridge 60 between the leg portions thereof, and acts as a stop for pawl 54. Attached to the bottom of casing 30 is a leaf spring 61 with an inverted U-shaped portion 61a at its end so disposed as to engage bottom edge 62 of pawl 54 when lever 51 carrying the pawl is in its lowermost position (as in Fig. 4), and to urge pawl 54 into engagement with segment 53, overcoming the effect of torsion spring 59. The teeth on segment 53 are so shaped that with downward movement they pass under the pawl, but with upward movement they may be engaged by pawl 54, thus raising the pawl and lever 51 therewith. When so engaged, levers 51 and 52 act as a unit, moving about the axis of pin 48. The range of upward movement through which pawl 54 may engage segment 53 is limited by abutment means in the form of an extension 63 on spring 61, engaging a lug 64 formed on the bottom of casing 30. It is not possible for the spring 61 to urge pawl end 62 after its extension 63 is stopped by lug 64.

A second vertical push rod 70 which is parallel to push rod 56 is arranged on the opposite side of pin 48 to counteract movements of push rod 56 by engaging bridge 60 of lever 51. Push rod 70 is connected to the free end of a thermostat bellows 71. Thermostat bellows 57 is connected by tubing 23 to bulb 22, and thermostat bellows 71 is connected by tubing 20 to bulb 21.

It will be evident that as the temperature in evaporator 17 increases, bellows 57 will be expanded to exert a downward thrust on push rod 56, thus tending to move levers 52 and 51 in a clockwise direction as viewed in Fig. 4, provided segment 53 and pawl 54 are engaged. If the movement continues, a position will be reached where the axis of the extensible link 50 will intersect the axis of pin 48. A further movement in a clockwise direction will cause lever 51 to snap to its uppermost position, while at the same time causing lever 47 to move in a counterclockwise direction, so that finger 46 on lever 47 will raise plunger 39, thus admitting fuel to burner 14.

Fig. 4 illustrates the relative arrangement of the levers at the beginning of such a movement as just described, in which case the fuel valve 37 is closed. Fig. 2 illustrates the relative arrangement corresponding to an open valve supplying fuel to burner 14.

With an increase of temperature in the still-absorber 15, bulb 21 will cause bellows 71 to expand, thus causing a downward movement of push rod 70, which by pressing on bridge 60 will cause lever 51 to move in a counter-clockwise direction. After passing dead center, lever 51 will snap to its lower-most position, thus causing lever 47 to move in a clockwise direction to close valve 37 and stop the flow of fuel to burner 14. Fig. 4 represents the condition of the mechanism when the valve 37 is closed.

It will be understood from the above description that bellows 71 can only function to close valve 37 and bellows 57 can only function to open valve 37.

To limit the clockwise movement of lever 47 upon closing of the valve 37, an extension is formed thereon below finger 46 for engaging a boss 75 formed on the bottom of casing 30. Movement in the opposite direction is limited by a depending lug 76 formed on the other end of lever 47 engaging the bottom of casing 30.

Movement of the lever 51 is limited by engagement with an offset portion 77 formed on the bottom of a latch member 78 extending through the top of casing 30 and joined to a handle 79, and by engagement with a lug 80 formed on a bearing plate 81 secured to casing 30. A slotted guide member 81a inside of the casing 30 restrains the latch member 78.

Movement of lever 52 clockwise is limited by a lug 82, which depends from an end thereof, engaging the bottom of casing 30, and counterclockwise by the lower end of segment 53 engaging the top of lug 64.

Latch member 78 provides a convenient means of opening the valve 37 to start the operation of burner 14.

To provide for varying the range of temperature through which bellows 57 may operate, a manual adjustment is provided as follows: A lever 85 of generally channel-shaped cross-section is fulcrumed on a pin 86 carried by the casing 30 and bearing plate 81 (Fig. 3). One end 87 of the lever 85 is formed to seat a coil compression spring 88, which encircles the rod 56 and presses against the free end of bellows 57, thus tending to prevent expansion of said bellows 57. The opposite end of lever 85 engages the inclined surface of a cone 89a formed on the end of a screw 89, which is threaded through an end of the casing 30. A finger grip or handle 90 is provided on the end of screw 80 which is outside the casing 30. Inward or outward movement of the screw 89 causes greater or less compression of the spring 88, thus varying the temperature range over which the bellows 57 will function. Stops 91 and 92 on the finger grip 90 and casing 30, respectively, engage to limit rotation of the screw 89.

Adjustment of the temperature point at which the bellows 71 closes valve 37 is obtained by means of a screw device comprising a nut 95 threaded through a boss 95a formed on the bearing plate 81. The nut 95 has a cylindrical bore which receives the rod 70. Extending between nut 95 and a collar 96 on push rod 70 is a compression spring 97 which tends to prevent expansion of bellows 71. An opening 85a in the lever 85 provides a clearance for the adjustment nut 95 and spring 97.

An automatic adjustment is provided for modifying the effect of spring 97 on bellows 71 so that an increase in temperature in bulb 24 will require a higher temperature in bulb 21 before bellows 71 can close fuel valve 37. This consists of a bellows 100 attached to the top of casing 30 with its free end pressing against the upturned end 101 of a lever 102 fulcrumed on the pin 86. Lever 102 is of channel shaped cross section and lies inside the leg portions of the channel shaped lever 85. A compression spring 103 which is positioned between levers 85 and 102 has the effect of counteracting expansion of the bellows 100 by urging end 101 of lever 102 against the lower extremity of said bellows 100. Bellows 100 is connected to bulb 24 by tubing 25. At the end of lever 102 remote from end 101, the side walls of the lever are slightly upturned to form lugs 104 which are disposed one on either side of push rod 70 and spring 96 so that the lugs 104 will engage collar 96 after push rod 70 has moved a slight distance downward in response to expansion of bellows 71. Thus it will be seen that as bellows 100 expands, lever 102 will move counterclockwise about pin 86 and lugs 104 will be raised. If now bellows 71 expands, collar 96 will engage lugs 104 which will assist spring 97 in counteracting bellows 71, with the result that a higher temperature in bulb 24 will require a higher temperature in bulb 21 before bellows 71 can actuate the snap action levers 47 and 51 to close the fuel valve 37. A slight compression and yielding of bellows 100 will result from the downward pressure of collar 96 on the lugs 104 of lever 102.

It will be noted furthermore that the effect of bellows 100 in modifying the operation of bellows 71 is varied somewhat by adjustment of the screw 89. As the end of lever 85 adjacent screw 89 is raised, the spring 103 between lever 102 and 85 will be compressed, thus requiring a higher temperature in bulb 24 before bellows 71 is affected.

For example, to maintain a lower temperature at evaporator 17, the screw 91 would be turned counter-clockwise as viewed in Fig. 1. The counteracting effect of spring 88 on bellows 57 would thus be decreased, permitting a lower temperature in bulb 22 to cause opening of valve 37. At the same time the counteracting effect of spring 103 on bellows 100 is increased.

It will be appreciated that the spring 88 associated with bellows 57 is very much stronger than the spring 103 which resists expansive movement of bellows 100.

A summary of the operation of the control device of this invention will now be given.

The burner 14 will heat the still-absorber 15 until a predetermined amount of ammonia or other refrigerant gas has been driven off. It has been noted that the rise in temperature of the still-absorber 15 will be proportional to the amount of ammonia driven off. When the temperature of the still-absorber 15 reaches a predetermined maximum, the expanding liquid in the thermostat bulb 21 and tubing 20 will actuate bellows 71. Expansion of the bellows 71 will move the rod 70 downward against the resistance of spring 97. The downward movement of rod 70 will cause lever 51 to rotate in a counter-clockwise direction which will, through the toggle link 50, produce a clockwise rotation of the lever 47. Such movement of the lever 47 permits spring 41 to close the valve 37 and shut off the supply of fuel to burner 14.

After the device has been started initially by manual operation of the latch member 78, it will be automatically started thereafter by the thermostat bulb 22 in the following fashion.

When the temperature in the evaporator 17 becomes too high, indicating exhaustion of the refrigerant, the fluid in thermostat bulb 22 will expand bellows 57 and push the rod 56 downward against the force of spring 88. This movement of the rod 56 will produce clockwise rotation of the lever 52 having the toothed segment 53 on one end. The corresponding upward motion of segment 53 will cause a similar movement of the pawl 54 which it engages. As a result of the upward motion of pawl 54, lever 51 will be snapped into an elevated position (Fig. 2) by the toggle link 50. The end of the lever 47, which carries the projection 49 will be forced into its lower-most position (Fig. 2) as lever 51 is elevated, and the finger 46 on the other end of said lever 51 will rise suddenly and open the fuel supply valve 37.

Due to the cooperating relations which have been stated, it will be seen that the pawl 54 will engage the toothed segment 53 only when valve 37 is in closed position.

By using a toothed segment 53 instead of only a single tooth, it is possible to insure turning on of the burner 14 irrespective of the room temperature at the thermostat bulb 24. If the room temperature is exceptionally high, for example 110 degrees Fahrenheit, bellows 57 will remain in a partially expanded condition during the initial operation of the evaporator 17. In this event, the toothed segment 53 will be kept in a correspondingly high position and the pawl 54 will engage a lower tooth on said segment 53 when the valve is closed in response to a suitably high temperature in the still-absorber 15.

As has been indicated, the bellows 100 which is connected to the thermostat bulb 24 is responsive to changes in the ambient temperature. An increase in room temperature will cause a corresponding expansion of the bellows 100. When this occurs, the upturned end 101 of lever 102 will be pushed downwardly, raising the lugs 104 on the other end of said lever, and thereby providing greater resistance to downward movement of the rod 70 which is responsive to the still-absorber thermostat bulb 21.

Therefore, it will be apparent that the higher the room temperature, the longer will be the operating period of the still-absorber 15, and the greater will be the amount of refrigerant available for cooling purposes.

These latter results, it will be observed, are obtained through an automatic operation of mechanism and occur simultaneously with an increase in ambient temperature.

To control in a predetermined manner the temperature in the refrigeration compartment or evaporator 17, it is necessary only to rotate the screw 89 in a proper direction. That is to say, clockwise rotation of screw 89 as seen in Fig. 1 will cause the end 87 of lever 85 which seats the spring 88 to move upwardly and compress said spring, so that a higher temperature in the evaporator 17 will be required to expand the bellows 57 sufficiently to open the fuel valve 37.

An opposite rotation of screw 89 will decrease the compression of spring 88 and permit the fuel valve 37 to be opened by a lower temperature in the evaporator 17.

It is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In an intermittent absorption refrigeration system, having an evaporator, a still-absorber, a fuel burner, and a fuel supply valve in operative relationship, the combination which includes: thermostatically-operated means associated with the evaporator for opening the fuel supply valve, thermostatically-operated means connected to the still-absorber for closing the fuel supply valve, thermostatically-operated means responsive to room temperature and including a pivoted lever which is spring biased for modifying the action of the means for closing the fuel supply valve, and an individual screw device for adjusting the said valve closing means.

2. In an intermittent absorption refrigeration system, having an evaporator, a still-absorber, a fuel burner, and a fuel supply valve in operative relationship, the combination which includes: thermostatically-operated means associated with the evaporator for opening the fuel supply valve and including a bellows and a push rod, thermostatically-operated means connected to the still-absorber for closing the fuel supply valve and including a bellows and a push rod, thermostatically-operated means responsive to room temperature for modifying the action of the means for closing the fuel supply valve and including a bellows, and an intermediately pivoted lever having one end engaging the bellows of the modifying means and its other end engaging a portion of the push rod of the closing means, the three bellows being arranged in parallelism.

3. In an intermittent absorption refrigeration system, having an evaporator, a still-absorber, a fuel burner, and a fuel supply valve in operative relationship, the combination which includes: thermostatically-operated means associated with the evaporator for opening the fuel supply valve, thermostatically-operated means connected to the still-absorber for closing the fuel supply valve, thermostatically-operated means responsive to room temperature for modifying the action of the means for closing the fuel supply valve, and manually controlled means for adjusting the means for opening the fuel supply valve, said manually controlled means including an intermediately pivoted lever and a conical-ended screw for varying the position of said lever.

4. In an intermittent absorption refrigeration system, having an evaporator, a still-absorber, a fuel burner, and a fuel supply valve in operative relationship, the combination which includes: thermostatically-operated means associated with the evaporator for opening the fuel supply valve, thermostatically-operated means connected to the still-absorber for closing the fuel supply valve, thermostatically-operated means responsive to room temperature for modifying the action of the means for closing the fuel supply valve, a casing for the several thermostatically-operated means, and a separate member accessible externally of the casing for manually operating the means for opening the fuel supply valve.

5. In an intermittent absorption refrigeration system, having an evaporator, a still-absorber, a fuel burner, and a fuel supply valve in operative relationship, the combination which includes: thermostatically-operated means associated with the evaporator for opening the fuel supply valve, thermostatically-operated means connected to the still-absorber for closing the fuel supply valve, and thermostatically-operated means responsive to room temperature for modifying the action of the means for closing the fuel supply valve, each thermostatically-operated means including a bellows; adjusting means for varying the action of the fuel supply valve opening and closing means; and a separate member for manually operating the means for opening the fuel supply valve, said separate member in its normal inoperative position being arranged to limit movement in one direction of a portion of the valve closing means.

6. The combination in an absorption refrigeration machine having a fuel valve of a bellows for opening the fuel valve, a bellows for closing the fuel valve, a bellows for controlling the operation of the bellows for closing the fuel valve, a spring for each bellows acting to resist the expansion thereof, and means for adjusting simultaneously the resisting actions of the springs for the bellows for opening the fuel valve and the bellows which controls the operation of the bellows for closing said valve.

7. In combination with a fuel valve, a control device comprising a bellows for opening the fuel valve, a bellows for closing the fuel valve, a bellows for controlling the operation of the bellows for closing the fuel valve, a spring for each bellows acting to resist the expansion thereof, and means for adjusting simultaneously the resisting actions of the springs for the bellows for opening the fuel valve and the bellows which controls the operation of the bellows for closing said valve.

8. The combination in an absorption refrigeration machine having a fuel valve of a bellows for opening the fuel valve, a bellows for closing the fuel valve, a bellows for controlling the operation of the bellows for closing the fuel valve, a spring for each bellows acting to resist the expansion thereof, means for adjusting simultaneously the resisting actions of the springs for the bellows for opening the fuel valve and the bellows which control the operation of the bellows for closing said valve, and means for adjusting independently the resisting action of the spring for the bellows for closing said valve.

9. An absorption refrigeration control device comprising, in combination, a bellows for opening a fuel supply valve; a bellows for closing the fuel supply valve; a bellows for restraining the operation of the bellows which closes said valve; two push rods, one connected to each of the valve-closing and valve-opening bellows; a first pivoted lever having one end engaging the push rod of the valve opening bellows and having a toothed segment on its other end; a second lever pivoted coaxially with the first lever and engaging the fuel valve with one end; a snap action toggle mechanism in engagement with the other end of the second lever; a third lever pivoted at one end coaxially with the first lever, connected to the second lever by means of the toggle mechanism and having a portion intermediate its length positioned to engage the rod of the bellows which closes the fuel supply valve; a pawl pivoted on the third lever and engaging the toothed segment of the first pivoted lever; and a fourth lever pivoted intermediate its ends and engaging the movable portion of the restraining bellows with one end and with the other end the push rod operated by the valve closing bellows.

10. An absorption refrigeration control device comprising, in combination, a bellows for opening a fuel supply valve; a bellows for closing the fuel supply valve; a bellows for restraining the operation of the bellows which closes said valve; two push rods, one connected to each of the valve closing and valve opening bellows; a first pivoted lever having one end engaging the push rod of the valve opening bellows and having a toothed segment on its other end; a second lever pivoted coaxially with the first lever and engaging the fuel valve with one end; a snap action toggle mechanism in engagement with the other end of the second lever; a third lever pivoted at one end coaxially with the first lever, connected to the second lever by means of the toggle mechanism and having a portion intermediate its length positioned to engage the rod of the bellows which closes the fuel supply valve; a pawl pivoted on the third lever and engaging the toothed segment of the first pivoted lever; abutment means for releasing the pawl from the toothed segment; and a fourth lever pivoted intermediate its ends and engaging the movable portion of the restraining bellows with one end and with the other end the push rod operated by the valve closing bellows.

ROY W. JOHNSON.